US009532559B1

(12) United States Patent
Hemmerlin et al.

(10) Patent No.: US 9,532,559 B1
(45) Date of Patent: Jan. 3, 2017

(54) FISHING ROD HOLDER

(71) Applicants: Ralph James Hemmerlin, Parker Prairie, MN (US); Randall James Christiansen, Parker Prairie, MN (US)

(72) Inventors: Ralph James Hemmerlin, Parker Prairie, MN (US); Randall James Christiansen, Parker Prairie, MN (US)

(73) Assignee: Hemmerlin Enterprises LLC, Parker Prairie, MN (US)

( * ) Notice: Subject to any disclaimer, the term of this patent is extended or adjusted under 35 U.S.C. 154(b) by 24 days.

(21) Appl. No.: 13/725,741

(22) Filed: Dec. 21, 2012

(51) Int. Cl.
*A01K 97/10* (2006.01)
*F16M 13/02* (2006.01)
*F16M 11/06* (2006.01)

(52) U.S. Cl.
CPC ............... *A01K 97/10* (2013.01); *F16M 11/06* (2013.01); *F16M 13/02* (2013.01)

(58) Field of Classification Search
USPC .................. 43/21.2; 248/511, 514, 520–521, 248/538–539
See application file for complete search history.

(56) References Cited

U.S. PATENT DOCUMENTS

| 970,751 | A | * | 9/1910 | Pranke ........................ 248/515 |
|---|---|---|---|---|
| 1,321,842 | A | | 11/1919 | Otto |
| 2,055,842 | A | | 9/1936 | Haislip |
| 2,540,584 | A | | 2/1951 | Jaycox |
| 3,077,327 | A | | 2/1963 | Batie et al. |
| 3,116,046 | A | | 12/1963 | Risdon |
| 3,687,493 | A | * | 8/1972 | Lock et al. ..................... 285/333 |
| 4,071,219 | A | | 1/1978 | Seager |
| 4,763,435 | A | | 8/1988 | Deering |
| 4,819,903 | A | | 4/1989 | Jimenez |
| 4,835,896 | A | | 6/1989 | Bowen |
| 4,877,165 | A | | 10/1989 | Behrle |
| 4,878,642 | A | | 11/1989 | Kirby, Jr. |
| 4,901,970 | A | | 2/1990 | Moss et al. |
| 4,903,929 | A | * | 2/1990 | Hoffman ................... 248/229.15 |
| 4,932,152 | A | * | 6/1990 | Barlotta et al. ................ 43/21.2 |
| 5,063,701 | A | | 11/1991 | Ottens |
| 5,325,620 | A | | 7/1994 | Reed et al. |
| 5,356,107 | A | | 10/1994 | Sinohuiz |
| D371,595 | S | | 7/1996 | Pieper et al. |
| 5,533,295 | A | * | 7/1996 | Hochberger ................... 43/21.2 |
| 5,557,876 | A | | 9/1996 | Parker |
| 5,560,137 | A | | 10/1996 | Herring |
| 5,865,124 | A | | 2/1999 | Wroe |

(Continued)

*Primary Examiner* — David Parsley
(74) *Attorney, Agent, or Firm* — Berggren Law Offices; William R. Berggren; Stephen F. Wolf

(57) ABSTRACT

A fishing rod holder comprising a tee pipe having a long cylinder and a short cylinder, a snap clamp element, a rotatable connection and an effective length. The long cylinder has a length and inside diameter for holding a fishing rod handle. The short cylinder is at right angles from the long cylinder, with a threaded inside surface and a long axis. The snap clamp element is screwably attached to the short cylinder and has a head with a width and a curvature adapted to securely fit around a support member, a body with a length and an end threaded to affix to the short cylinder of the tee pipe. The rotatable connection comprises a release surface on a threaded end to permit stable rotation of the snap clamp of up to 90 degrees about the axis of the short cylinder. The effective length is from the long cylinder curvature.

18 Claims, 4 Drawing Sheets

(56) References Cited

U.S. PATENT DOCUMENTS

| | | |
|---|---|---|
| D408,885 S | 4/1999 | O'Neill |
| 5,899,527 A | 5/1999 | Elvidge et al. |
| 6,042,180 A | 3/2000 | Lombardi |
| 6,409,131 B1 | 6/2002 | Bentley et al. |
| 6,588,362 B1 | 7/2003 | Cope |
| D480,782 S | 10/2003 | DeBerry et al. |
| 6,898,893 B1 | 5/2005 | Mukdaprakorn |
| D507,817 S | 7/2005 | Mitchell |
| 7,047,688 B2 | 5/2006 | Sandman, Jr. |
| 7,309,054 B2 | 12/2007 | Slatter et al. |
| 7,320,196 B2 | 1/2008 | Diederichs |
| 7,395,772 B2 | 7/2008 | Slatter |
| 7,530,324 B2 * | 5/2009 | Salerno .................. A01K 97/10 114/364 |
| 7,699,277 B2 * | 4/2010 | Bagnall ...................... 248/206.5 |
| 7,765,732 B1 | 8/2010 | Canevari |
| 2007/0044367 A1 * | 3/2007 | Slatter ........................... 43/21.2 |

\* cited by examiner

FISHING ROD HOLDER

FIELD OF THE INVENTION

This invention relates to a fishing rod holder attachable to a structure containing a pole. The invention particularly relates to use with fish house or folding chair structures.

BACKGROUND OF THE INVENTION

There is a need for a fishing rod holder that is flexible and easy to attach and detach from more secure structures that contain a pole or other structural member.

There has been a long-term need for fishing rod holders. Fishing is a pastime that can result in a long period of time between nibbles on a line from a fish. This is true in such diverse places as, for example, in chairs on a beach, dock or shoreline; in boats; and in an ice-fishing house. Often times the person would rather do other things than hold a fishing rods. This is particularly true in camping or fish-house settings.

Fishing rod holders have been around for a long time. Early holders were branches of wood that could support a fishing rod. Eventually sturdier fishing rod holders were developed that held their position even while a fish bit the hook and began swimming away. Many fishing rod holders comprise one or more tubes that are fix-mounted to surfaces with screws and held at an angle from horizontal that is typically about 45 degrees. Others are detachable and mounded with attaching devices such as, for example, set-screws. These devices require tools to attach and detach from a support. Both are time consuming to install, and have limited range of motion to accommodate the positions of various firmly positioned structures.

Some fishing rod holders have been developed that do not require tools to attach or detach from support members. However, these fishing rod holders lack flexibility in adjusting the orientation of the holder to the supporting member to achieve an optimum position. People who fish frequently desire convenience, speed and flexibility.

There still is a need for a fishing rod holder that is flexible and easy to attach and detach from more secure structures that contain a pole.

SUMMARY OF THE INVENTION

We have invented a flexible fishing rod holder apparatus easily attached to and detached from supporting members with the flick of a wrist and can be adjusted in angle of up to 90 degrees in a stable manner about a line perpendicular to the length of the support member. The apparatus comprises a tee pipe having a long cylinder and a short cylinder, a snap clamp element, a rotatable connection point and an effective length. The long cylinder has a length and inside diameter suitable to loosely hold the handle of a fishing rod. The short cylinder is at right angles from the long cylinder, with a threaded inside surface and a long axis down the center of the short cylinder. The snap clamp element is screwably attached to the short cylinder and has a head with a width and a curvature adapted to securely fit around a support member without the use of screws or tools, a body with a length and an end threaded to affix to the short cylinder of the tee pipe. The rotational connection point comprises a release surface affixed to a male threaded end to permit stable rotation of the snap clamp head about the axis of the short cylinder of up to 90 degrees. The effective length between the point where the long axis of the short cylinder first touches the long cylinder and the point of the inside of the snap clamp element curvature that is nearest the short cylinder.

We have also invented a method of using an adjustable fishing rod holder apparatus comprising at least six steps. The first step is providing a fishing rod holder apparatus that comprises four elements. The first element is a tee pipe that has a long cylinder with a length and inside diameter suitable to loosely hold the handle of a fishing rod, and a short cylinder at right angles from the long cylinder, with a threaded inside surface and an axis down the center of the short cylinder. The second element is a snap clamp element that has a head with a width and a curvature adapted to securely fit around a support member without the use of screws or tools, a body with a length and an end threaded male end to affix to the short cylinder of the tee pipe. The third element is a rotatable connection point that comprises a release surface affixed to the male threaded end to permit stable rotation of up to 90 degrees about the axis of the short cylinder. The fourth element is an effective length that is the distance between the point where the long axis of the short cylinder first touches the long cylinder and the point of the inside of the snap clamp element curvature that is nearest the short cylinder. The second step is providing a support member. The third step is snapping the snap clamp element to the support member at a suitable location about the long axis of the support member without use of tools. The fourth step is rotating the tee pipe about the axis of the short cylinder of the tee pipe to achieve a desired upward angle from horizontal of the long cylinder of the tee pipe. The fifth step is placing fishing line with a fish-attracting element into the water. The sixth step is placing the handle end of a fishing pole in communication with the fishing line into the long cylinder.

As used herein:

"Stable rotation" means the holder can be rotated up to 90 degrees about the axis of the short cylinder and the position will remain stable under the pull of at least a two pound fish on the line of a fishing rod.

"Support member" means a structure, typically tubular but may be with a polyhedral cross-section, that is stationary during use such as, for example, cylinders in a lawn chair or poles in a tent or ice-fishing house.

"Vertically oriented" means that a person using a fishing rod may easily adjust the orientation of the fishing rod holder 90 degrees in a vertical plane parallel to the long axis of the support member at point of contact.

"Without need of tools" means the apparatus can be attached, detached and orientation by hand without the use of tools.

Our adjustable fishing rod holder has the advantages of speed, flexibility and simplicity. The apparatus can by quickly mounted to any of the support rods of structures such as, for example, a folding chair near a shoreline, on a boat or supports in a tent, by placing the hook end of the snap clamp over the pole. It is adjustable because the long cylinder can be rotated about the axis that passes through the short cylinder at least 90 degrees until the long cylinder can hold the handle of a fishing prod in a desired upward position. The resulting position is stable under the pull of a fish on the end of the line attached to the fishing rod until a person can pull the rod from the cylinder and reel in the fish. It is simple in that it just involves a tee-pipe and a snap clamp without any screws or other fixtures.

BRIEF DESCRIPTION OF THE DRAWINGS

One or more features or preferred forms of the invention are described in the accompanying drawings. The drawings are described briefly below.

DETAILED DESCRIPTION OF SOME EMBODIMENTS OF THE INVENTION

Figure 1:
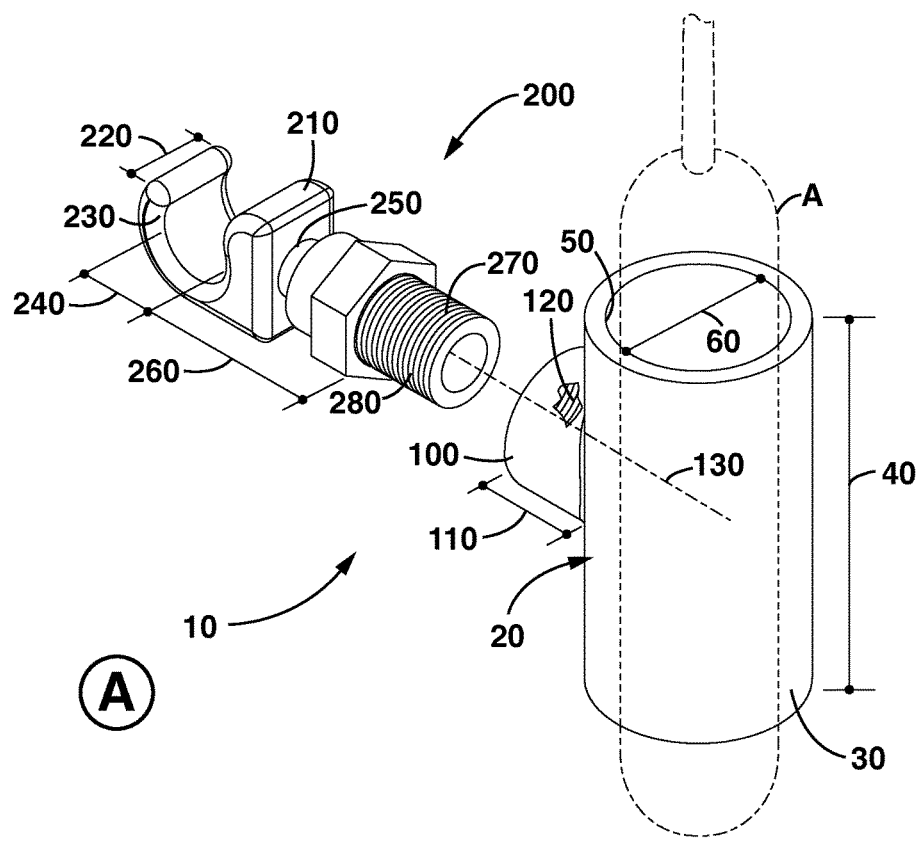
FIG. 1 is an illustration of one embodiment of the invention with (A) depicting an exploded perspective view and (B) depicting an assembled perspective view.
Figure 1:
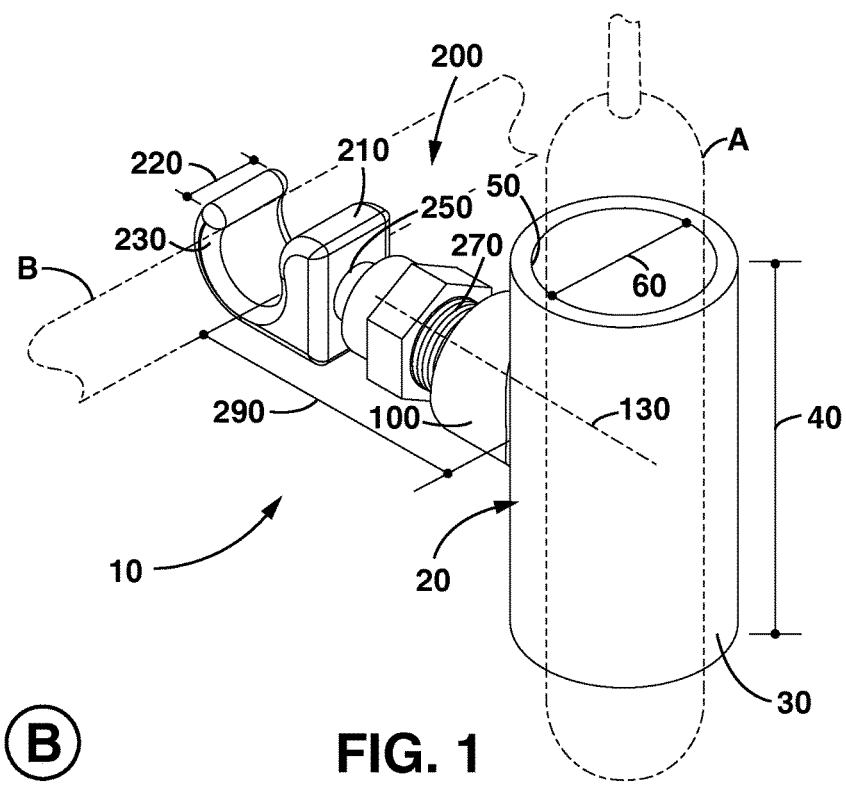

The present invention relates to a device for holding a fishing rod in a level or raised position, and more particularly to a rod holder for holding a fishing rod so as to free a fisherman from holding the fishing rod manually. The invention uses a unique mounting arrangement that allows the rod holder to be removably mounted to a support member such as, but not limited to, a frame of a portable ice fishing shelter, a seat pedestal of a fishing boat, or on a leg of a lawn chair, which keeps the reel from coming into contact with the ground, snow, ice, or water, and from loss, due to a biting fish.

Known fishing rod holders or lawn chairs with accessory holders that may have some relevance to the invention can be categorized into three groups. Group One comprises a fishing rod bracket/support/holder that is described for use on a chair, or is attachable to a support structure having a cylindrical shape but often is complex, sometimes requires tools to attach and detach from a support and is not sufficiently flexible in orientation. None contains a snap clamp to attach the fishing rod holder to a support structure. No "vertical adjustability" means the user has little or no vertical adjustability in a plane parallel to the support structure to achieve an optimum angle between the holding element and the clamping element that may be attached to supporting members having various orientations from horizontal. Representative references include the following. U.S. Pat. No. 1,321,842 teaches a cylinder with wire spring clamp for fastening the cylinder to a horizontal support where the wire clamp appears to provide weak support needing the fishing rod to rest on another surface and no vertical adjustability is available. U.S. Pat. No. 2,055,842 teaches a fishing rod holder attachable to a support with a rectangular C-clamp attachment fixture that appears not well suited for clamping against a curved surface and is vertically adjustable through complex screws and nuts requiring tools. U.S. Pat. No. 2,540,584 teaches a fishing rod holder designed to attach to a gunwale of a boat, has a complex attaching mechanism requiting tools and a rectangular C-clamp attachment fixture that appears not well suited for clamping against a curved surface. U.S. Pat. No. 3,116,046 teaches a one piece refreshment container holder clamping device that is attached to lawn chairs without any vertical adjustability. U.S. Pat. No. 4,071,219 teaches a substantially horizontal fishing rod holder that expends outward from a lawn chair but requires tools to install and detach and has a fixed position with no vertical adjustability. U.S. Pat. No. 4,819,903 teaches a simplified fishing rod holder that press-clamps onto vertical poles of a portable chair but has a fixed position with no vertical adjustability. U.S. Pat. No. 4,877,165 teaches a device that uses a screw and a clamp to attach device to a support and has a fixed position with no vertical adjustability. U.S. Pat. No. 4,878,642 teaches a fishing rod holder attached to a force fit clamp through a rotatable open cylindrical bore surface that is fixed with a bolt, nut, lock washer combination requiring tools. U.S. Pat. No. 4,901,970 teaches a fishing holder with a screw mounded bracket for attaching to a support pole that can be vertically adjusted by unscrewing the bracket, rotating it to a desired position and screwing the bracket together again. U.S. Pat. No. 5,560,137 teaches an environment-adaptable hands-free fishing rod holder assembly requiring tools to attach and detach from supports and having little vertical adjustability. U.S. D408,885 teaches a fishing rod cradle attached to a support with a clamp that is screw mounted, the cradle having no vertical adjustability. U.S. Pat. No. 6,409,131 teaches an easily re-positionable, quick attach and release, multiple purpose support system that attaches to a supporting structure with a push and a ¼ turn of its bracket element but has limited vertical adjustability by user. U.S. Pat. No. 6,588,362 teaches a fitted bracket for use on a boat and other structures and that can be used as a fishing rod holder comprising a first tee with a closed long cylinder to hold a rod, a second tee comprising a long lengthwise-cutout cylinder forming a press clamp, and a sleeve to join the two tees at their short cylinder with little stable vertical adjustability. U.S. D480,782 teaches a fishing rod holder that rotates about a screw-clamp fixture used to fasten the holder to a support cylinder, the holder having no vertical adjustability. U.S. Pat. No. 6,898,893 teaches a portable fishing pole holder with a clamp that fastens to a support cylinder and is tightened with a screw but no vertical adjustability. U.S. Pat. No. 7,047,688 teaches a fishing rod holder mount for recreational fishing boat chairs able to hold multiple fishing rod holders attached to setscrew-fixed short cylinders over rods of the mount fastened to the vertical post that mounts the chair to the boat but having no vertical adjustability without tools. U.S. Pat. No. 7,309,054 teaches screw-assembled universal clamp that can be attached to a support cylinder and can also be attached to a fishing rod holder where there is no vertical adjustability of the holder without disassembly and manual step-wise rotation to a desired setting before reassembly. U.S. Pat. No. 7,395,772 teaches screw-assembled universal clamp that can be attached to a support cylinder and can also be attached to a fishing rod holder where there is no vertical adjustability of the holder without manual rotation to a desired setting followed by setting position with a set-screw.

Group Two comprises references that show the use of PVC pipe/fittings in a fishing rod attachment bracket/support/holder but are complex, require tools to attach and detach from a support or are not flexible in orientation. None contains a snap clamp to attach the fishing rod holder to a support structure. Representative references include the following. U.S. Pat. No. 4,763,435 teaches a fishing rod holder on a self-supporting stand that is not designed to attach to supporting structures and has limited vertical adjustability. U.S. Pat. No. 5,533,295 teaches a fishing rod holder on a self-supporting stand that is not designed to attach to supporting structures and has limited vertical adjustability. U.S. D371,595 teaches a fishing rod holder mount for recreational fishing boat chairs able to hold a fishing rod holders attached to setscrew-fixed short cylinder fastened to the vertical post that mounts the chair to the boat but having no stable vertical adjustability. U.S. D507,817 teaches two fishing rod holders on a self-supporting stand that is not designed to attach to supporting structures and has limited vertical adjustability U.S. Pat. No. 7,765,732 Fishing rod support attached to a pad to permit more leverage by a person holding the rod, the holder that is not designed to attach to supporting structures and has having no vertical adjustability.

Group Three comprises references that show a lawn/folding chair and an attachment bracket/support/holder of some type but requires tools to attach and detach from a support or is not flexible in orientation. None contains a snap clamp to attach the fishing rod holder to a support structure. Representative references include the following. U.S. Pat. No. 3,077,327 teaches a folding chair with a wire fishing holder and tackle box affixed with screws to the chair leg and the holder having no vertical adjustability. U.S. Pat. No. 4,835,896 teaches a lawn chair fish fighter comprising a fishing rod holder pivotally hooked to the horizontal seat of a lawn chair so a user can apply leverage on the rod during the reeling-in of a fish, where the holder has no vertical adjustability. U.S. Pat. No. 5,063,701 teaches a complex fishing rod holding attachment for collapsible chair where the holder is attached to a leg of the chair with a clasping bracket a d raised above ground with a pedestal such that there is limited adjustability with a pedestal comprising two rods where one is slideably joined to the holder. U.S. Pat. No. 5,325,620 teaches fishing pole support attached to the vertical support of a lawn chair with a split cylinder sleeve attached with screws by use of tools and angled to receive a fishing rod laid upon it with one end upon the ground next the chair, and where the holder has no vertical adjustability. U.S. Pat. No. 5,356,107 teaches a beverage container holder attachable to a lawn chair vertical leg with a deformable sleeve-shaped hollow cylindrical clamping member and no vertical adjustability. U.S. Pat. No. 5,557,876 teaches a single piece fishing rod holder that can be placed around a vertical support structure that has a free end and holds a fishing rod with mo vertical adjustability. U.S. Pat. No. 5,865,124 teaches a table attachment for lawn chairs that is held to the chair by a bend cylinder attached to the vertical chair support with two hollow half cylinders that snap together, the table having no vertical adjustability. U.S. Pat. No. 5,899,527 teaches a fisherman's chair system comprising a cylindrical fishing rod holder with a forward set-screw and threaded clamp for securing the rod to the holder where the holder is attached with a tool-tightened hinge to a vertical post that is fix-mounted to the arm of the chair. U.S. Pat. No. 6,042,180 teaches a folding chair with fishing accessories including a tubular fishing rod holder joined to the leg of the chair with an extending member but having no vertical adjustability. U.S. Pat. No. 7,320,196 teaches a one-piece fishing rod holder having a mounting slot connected to locking groves to fit around the support rod but not having any vertical adjustability.

All of the above references lack the meaningful combination of our invention. They either lack vertical adjustability, attachment, and detachment to support structures without use of tools, or stable positioning when desired vertical alignment is achieved.

We have invented a flexible fishing rod holder apparatus that is easily attached to and detached from supporting cylinders with the flick of a wrist and without the use of tools. In addition, it can be adjusted in an angle of up to 90 degrees in a stable manner about a line perpendicular to the length of the support member. The apparatus aspect comprises a tee pipe having a long cylinder and a short cylinder, a snap clamp element, a rotatable connection point, and an effective length.

The long cylinder of the tee pipe has a length and inside diameter suitable to loosely hold the handle of a fishing rod. The long cylinder also has an inner surface that is smooth. In some embodiments, the length of the long cylinder is at least 3 inches and the inside diameter is at least 1.2 inches.

In some embodiments, the length is at least 5 inches and the inside diameter is at least 1.5 inches.

The short cylinder of the tee pipe extends at a right angle from the long cylinder with an axis down the center of the short cylinder. In addition, the inside surface is threaded.

The snap clamp element comprises a snap clamp head, a body having a length and an outer surface, and a threaded outer end. The threaded outer end allows the snap clamp element to be screwably attached to the short cylinder with a snap clamp head extending outward from the end opposite that attached to the short cylinder. The snap clamp head has a width and a curvature adapted to attach in a releasable manner around a support member without the use of screws or tools. The opening of the snap clamp head may extend outward from the axis of the shout cylinder or at some angle from the axis. Some embodiments are at right angles of the axis of the short cylinder. The snap clamp head may be adapted to releaseably adhere to a cross-section that has any shape such as, for example, a cylinder, a square or a polygon as long as the circumference of the support member is similar to the inside diameter of the snap clamp element. In this manner, the curvature extends more than 50 percent and less than 75 percent around the cross-section of the support member at point of attachment. Also, the snap clamp head is constructed with appropriate materials and dimensions to offer some resiliency to permit a firm grasp of the support member when pressed against it to cause an attachment. In some embodiments, the width is about the same as the inside diameter.

The support member is any member that is securely in contact with the ground and is used in the activity of fishing. This includes, for example, the frames of chairs that are sat upon, ice fishing structures on frozen lakes, ponds or rivers, tent poles of tents that are pitched along lakes rivers or other bodies of water that have fish. Although the support member can have any cross-section as discussed above, typically the support member is cylindrical and secularly in contact with the ground.

Using a cylinder shape as an example of a support member, a suitable snap clamp element embodiment for this example comprise an adapted curvature having short partially opened cylinder having a cylinder length, also known as the snap clamp width, an inside diameter and a circumference with a closed portion and an open portion. The length is similar in dimension to the diameter. The closed portion of the circumference is more than the open portion of the circumference. In some embodiments, the ends of the closed portion flare outward to assist connection of the snap clamp head to the support member and permit use of more rigid materials. In addition, the material is flexible such that the snap clamp head opens when pressed against the cylinder support member having an outside diameter similar to the open diameter of the snap clamp head. In this manner, the snap clamp head opens until is allows the support member to enter, and then securely encloses the support member with sufficient force to hold the snap clamp stationary. Materials having suitable strength and flexibility are plastics such as, for example, nylon and poly vinyl chloride. In some embodiments, the length and inside diameter are both 0.75 inches, suitable for adhering to 0.75-inch diameter support cylinders. In some embodiments the length and open diameter are 1 inch, suitable for adhering to 1-inch diameter support cylinders.

The body of the snap clamp element serves two purposes. The first purpose is to provide sufficient strength to the snap clamp head to permit a secure attachment of the snap clamp element to the support member. The second purpose is to provide sufficient distance from the long cylinder and the support member to permit easy holding of the handle of the fishing rod, generally with reel. The first purpose is typically satisfied with a length of between 0.25 inch and 0.50 inch. The latter relates the torque applied to the snap clamp head when a fishing rod handle is in the long cylinder and a fish of less than 3 pounds is hooked to the line. That distance is the effective length.

The effective length is the distance between the point where the long axis of the short cylinder first touches the long cylinder and the point of the inside of the snap clamp curvature nearest the short cylinder. The components of the effective length include the length of the body of the snap clamp device, the length of the short cylinder when they are screwably attached and the length of any open threaded portions of the assembled apparatus. The effective length is sufficient to allow a fishing rod handle to be freely supported in the long cylinder but not too great as to cause the snap clamp element to prematurely release from the support member. In some embodiments, the effective length is at least 1.5 inches and not more than 5 inches. In some embodiments, the effective length is at least 2 inches and less than 3.5 inches. The effective length may include open threaded portions of any male threaded end that is not fully enclosed by a female threaded end.

As said above, the effective length is composed of the distance between the point where the long axis of the short cylinder intersects with the long cylinder and the point where the inside of the curvature of the snap clamp head is nearest the short cylinder. In some embodiments, the body of the snap clamp may only be sufficient to permit a strong clamping action and an additional separate extension member may be used. The extension member body, typically a cylindrically shaped element, has a male threaded end at one end, a short body and a female threaded end ant the other end. The short body may have gripping structures on its outside to facilitate fastening it to the short cylinder or the snap clamp element. The male end is adapted to screwably attach to the threaded end of the short cylinder and the female end is adapted to screwably attach to the threaded end of the snap clamp. In these embodiments one end of the separate body element is permanently attached to the either the male-threaded end of the snap clamp or the female-threaded end of the short cylinder. Attachment may be by any method known to the art such as, for example, glue, double-coated adhesive tape, or sonic welding. This leaves a threaded male end that releasably attaches either the snap clamp element to the extended female-threaded end of the extended short cylinder or the male-threaded extended snap clamp to the female-threaded end of the short cylinder.

The rotatable connection point is the point where the snap clamp element can rotate up to 90 degrees about the long axis of the short cylinder and hold its position in a stable manner. This is achieved by placing a release surface on to the male threaded end that is desired to be rotated. When plastic elements of similar materials are screwed together firmly, they commonly form an attraction that results in the elements being difficult to separate them by unscrewing them. Alternatively, if the elements are not firmly screwed together, they tend to rotate easily and not hold a stable position. To solve this dilemma, the apparatus uses a release surface affixed to the male threaded end to permit stable rotation of up to 90 degrees about the axis of the short cylinder. The surface has a surface tension less than that of the material of the threaded elements. In addition, optionally, it has some thickness to increase the adherence of the male and female surfaces under rotation. The thickness is typically on the order of between 0.001 and 0.010 inches (25 to 250 microns) but may be higher or lower depending on conditions and materials.

The release surface may have various forms. Some embodiments are adhesive tape having a high release backing such as, for example, TEFLON® or silicone applied under a stretching force over the male threads to allow the thread contour to show. Some embodiments are low adhesion back size coatings known to the art of adhesive tapes.

Use of the release surface permits stable rotation of the long surface about the axis of the short cylinder of up to 90 degrees to achieve a desired orientation of the fishing rod holder relative to the ground. The new position is stable under the pulling force from a fish attached to the line of the fishing rod and having a weight of at least two pounds. For some embodiments, the position is stable for a fish of at least three pounds.

Typically the snap clamp can be attached to the support member in any position about is long axis. Typically support members have an arc of at least 180 degrees about its long axis of space that is substantially free of obstructions. As an example, the support member on the side of a chair has free space along the outside of the chair. Similarly the support member in an ice house has an unobstructed space away from the ice house covering.

The positioning of my fishing rod is much more flexible than others currently known. When the 180 degree rotation about the long axis of the support member is combined with the 90 degree rotation about the axis of the short cylinder that projects at right angles to the support member, the fishing rod can be placed in a stable position at virtually any orientation relative to a ground plane.

Figure 2:
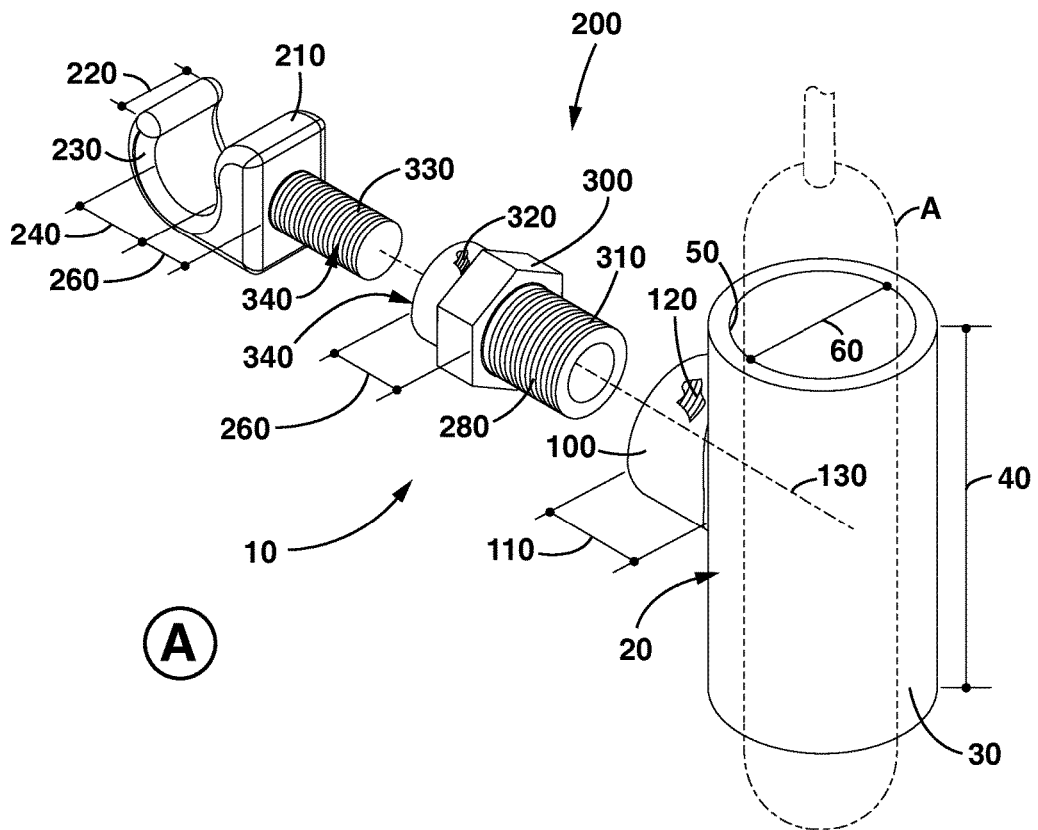
FIG. 2 is an illustration of another embodiment of the invention with (A) depicting an exploded perspective view and (B) depicting an assembled perspective view.
Figure 2:
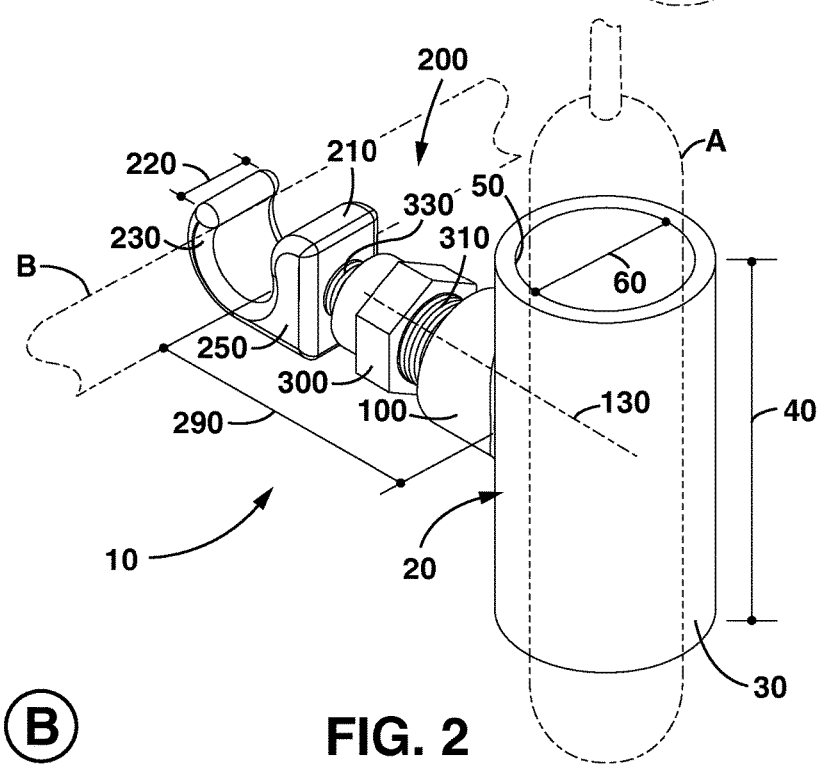

Two different embodiments are shown in FIGS. 1 and 2. The same numbers are used to designate similar elements. FIG. 1 is an illustration of one embodiment of the invention where the body and the snap clamp are unified where View A is an exploded perspective and View B is an assembled perspective. A fishing rod holder apparatus (10) comprises a tee pipe (20) made of a long cylinder (30) having a length (40), an inside surface (50) that is smooth and an inside diameter (60) that is sufficient to loosely hold a fishing rod handle (A). Tee pipe 20 also comprises a short cylinder (100) with a length (80), a female threaded inside surface (120) and a long axis (130). A snap clamp element (200) has a head (210) with a width (220) and a resilient curvature (230) with an inside diameter (240) that forms an opening that is able to securely fit around a support member (B). Snap clamp element 200 also has a body (250) with a length (260) and a male threaded end (270). The male threaded end 270 has a release surface (280) that permits stable rotation of snap clamp element 200 about short cylinder axis 130 of up to 90 degrees. An effective length (290) extends from the curvature nearest short cylinder 100 to where the short cylinder axis 130 contacts long cylinder 30.

FIG. 2 is an illustration of another embodiment of the invention where the body and the snap clamp are initially separate where View A is an exploded perspective and View B is an assembled perspective. Fishing rod holder apparatus 10 comprises tee pipe 20 made of long cylinder 30 having length 40, inside surface 50 that is smooth and inside diameter 60 that is sufficient to loosely hold fishing rod handle A. Tee pipe 20 also comprises short cylinder 100 with length 80, female threaded inside surface 120 and long axis 130. Snap clamp element 200 has head 210 with width 220 and resilient curvature 230 with inside diameter 240 that forms an opening that is able to securely fit around support member B. Snap clamp element 200 also has body 250 with length 260 and a male threaded end 330. Extension member (300) with a threaded male end (310) and a female threaded end (320) is used to extend the length of snap clamp element 200. Female end 320 is attached to a snap clamp male threaded end (330) with a glue (340) to prevent rotation at this connection. Male threaded extension end 310 with release surface 280 is affixed in a rotatable manner to short cylinder female threaded end 120 to permit stable rotation of snap clamp element 200 about short cylinder axis 130 of up to 90 degrees. Effective length 290 extends from the curvature nearest short cylinder 100 to where the short cylinder axis 130 contacts long cylinder 30.

An alternative embodiment is the same as that illustrated in FIG. 2 except the extension member is an extension of the short cylinder instead of the snap clamp element. Release surface 280 is on snap clamp male threaded end 330 to permit stable rotation about the short cylinder long axis 130 and glue 340 is on extension member male threaded end 310 to prevent rotation at this point.

We have also invented a method of using an adjustable fishing rod holder apparatus comprising at least six steps. The first step is providing a fishing rod holder apparatus that comprises four elements. The first element is a tee pipe having a long cylinder with a length and inside diameter suitable to loosely hold the handle of a fishing rod, and a short cylinder at right angles from the long cylinder, with a threaded inside surface and an axis down the center of the short cylinder. The second element is a snap clamp element with a head with a width and a curvature adapted to securely fit around a support member without the use of screws or tools, a body with a length and a male end threaded to screwably affix to the short cylinder of the tee pipe. The third element is a rotatable connection point comprising a release surface affixed to a male threaded end to permit stable rotation of the snap clamp head of up to 90 degrees about the axis of the short cylinder. The fourth element is an effective length comprising the distance between the point where the long axis of the short cylinder first touches the long cylinder and the point of the inside of the snap clamp curvature nearest the short cylinder. The second step is providing a support member. The third step is snapping the snap clamp element to the support member at a suitable location about the long axis of the support member without use of tools. The fourth step is rotating the tee pipe about the axis of the short cylinder of the tee pipe to achieve a desired upward angle from horizontal of the long cylinder of the tee pipe. The fifth step is placing fishing line with a fish-attracting element into the water. The sixth step is placing the handle end of a fishing pole in communication with the fishing line into the long cylinder.

As taught above, the effective length of the fish rod holder apparatus is at least 1.5 inches and no more than 5.0 inches.

The method may further comprise the following two steps. The seventh step is removing the handle of the fishing rod from the apparatus when a fish is hooked. The eighth step is reeling in the fish.

Our method is fast, simple, small and effective—all features greatly desired by people who recreational fish. In use, the snap clamp is able to be attached to a support member by pressing the snap clamp element against the support member at a point where connection is desired. The long cylinder can then be rotated with pressure to the desired orientation. Then the fishing rod can be set in the water with the handle in the holder until a bite occurs from a fish. The rod can then be removed from the holder and the fish can be reeled in. When finished using the holder, the user can remove it from the support member with a simple twist of the wrist and place it with other fishing equipment such as, for example, tackle.

Figure 3:
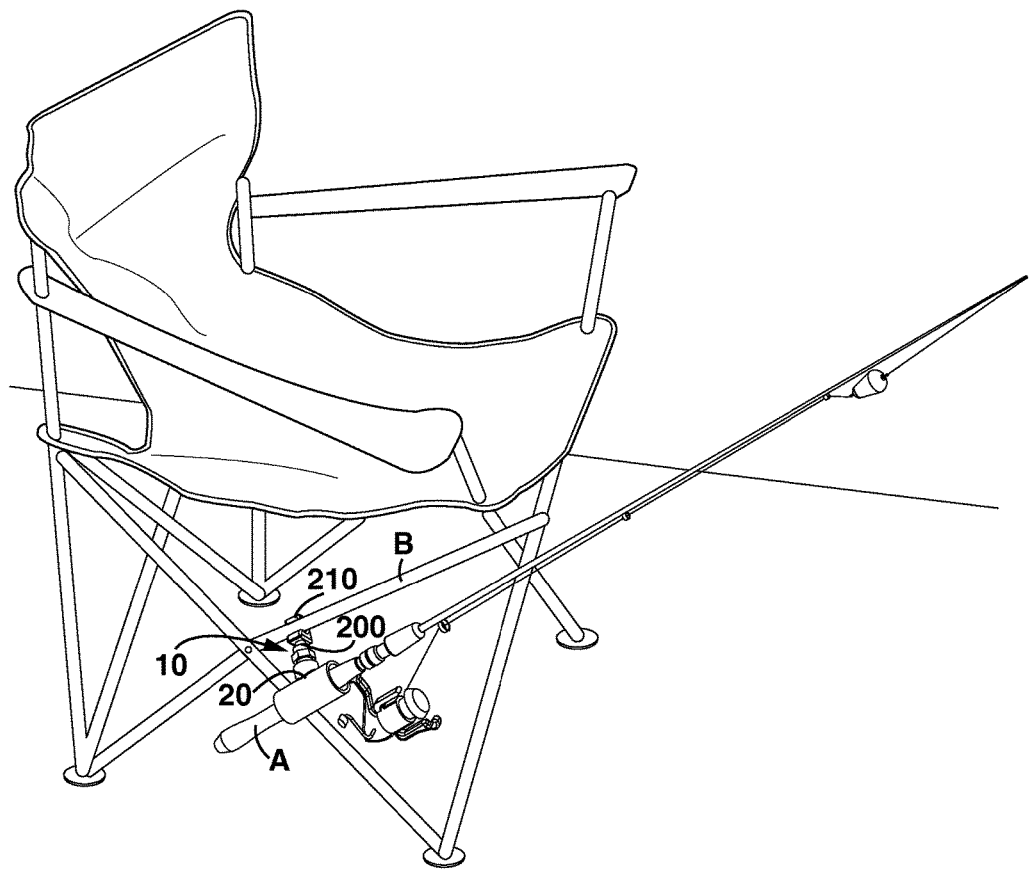
FIG. 3 is a view of the use of the embodiment of FIG. 1 with a folding chair.

FIG. 3 is a view of the use of the embodiment of FIG. 1 with a folding chair. As shown, the effective distance permits the long cylinder to be rotated freely to a desired upward angle without the fishing rod handle obstructing movement.

Figure 4:
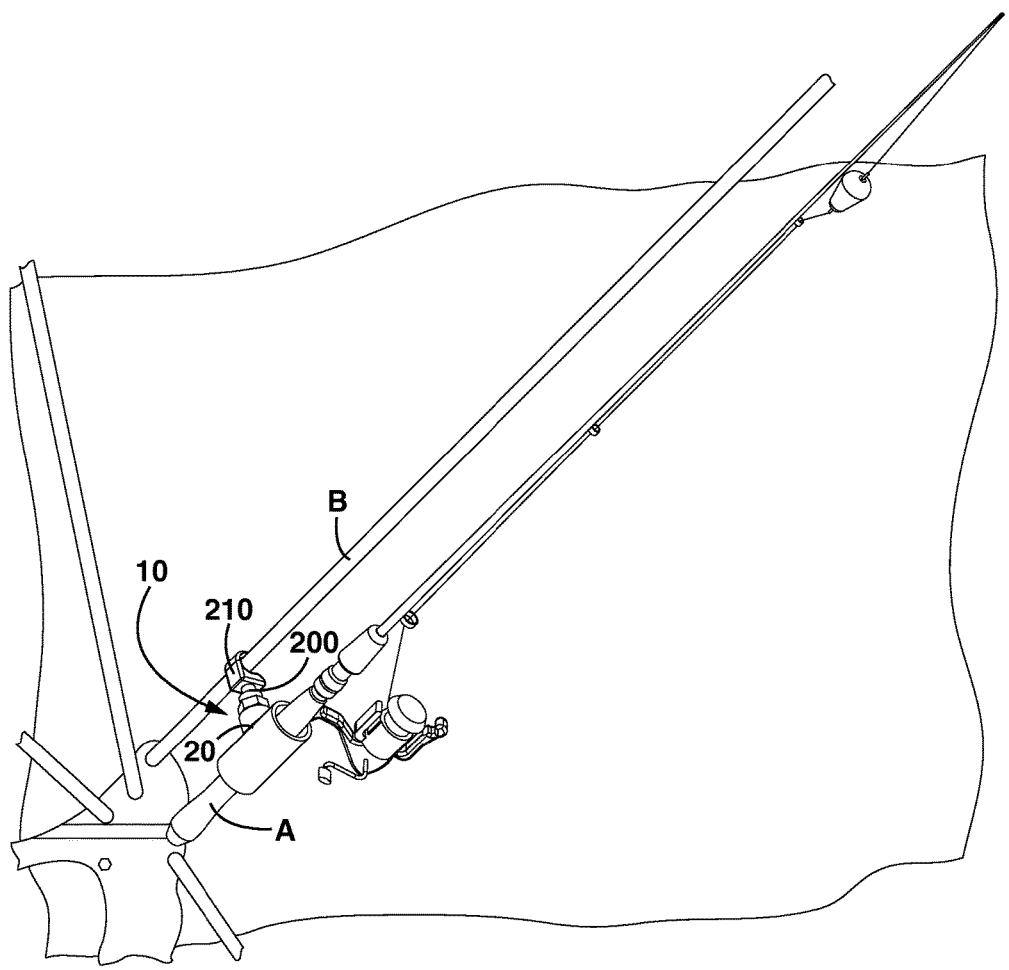
FIG. 4 is a view of the use of the embodiment of FIG. 1 with a ice house support.

FIG. 4 is a view of the use of the embodiment of FIG. 1 with an angled support in an ice fishing house. As shown, the effective distance permits the long cylinder to be rotated freely about a plane perpendicular to the long axis of the short cylinder to a desired upward angle without the fishing rod handle obstructing movement.

Other modifications and changes regarding my invention will be apparent to those skilled in the art. The invention is not considered limited to the embodiments chosen for purposes of disclosure and covers all changes and modifications that do not constitute departures from the true spirit and scope of this invention.

What is claimed is:

1. A fishing rod holder apparatus, comprising:
   a tee pipe having a long cylinder with a length and inside diameter suitable to loosely hold the handle of a fishing rod, and a short cylinder at right angles from the long cylinder, with a threaded inside surface and an axis down the center of the short cylinder;
   a snap clamp element comprising a head with a width and a curvature adapted to securely fit around a support member without the use of screws or tools, a body and a male end threaded to screwably affix without the use of screws to the threaded inside surface of the short cylinder that forms a female end;
   a rotatable connection point comprising a release surface, having a surface tension less than that of the material of the male threaded end of the snap clamp element and the female end of the short cylinder, configured to permit continuous rotation of the snap clamp head about the axis of the short cylinder of up to 90 degrees wherein the rotatable connection point, after rotation, will remain stable; and
   an effective length comprising the distance between the point where the long axis of the short cylinder first touches the long cylinder and the point of the inside of the snap clamp curvature nearest the short cylinder that is sufficient to allow the fishing rod handle to be freely supported in the long cylinder but not too great as to cause the snap clamp head to prematurely release from the support member.

2. The apparatus of claim 1 wherein rotatable connection point, after rotation, will remain in a stable position under the pull of a two pound fish on the line of a fishing rod.

3. The apparatus of claim 1 wherein the rotatable connection point, after rotation, will remain in a stable position under the pull of a three pound fish on the line of a fishing rod.

4. The apparatus of claim 1 wherein the length of the long cylinder is at least 3 inches and the inside diameter is at least 1.2 inches to allow the fishing rod handle to be freely supported in the long cylinder.

5. The apparatus of claim 1 wherein the effective length is about 1.5 inch to allow the fishing rod handle to be freely supported in the long cylinder.

6. The apparatus of claim 1 wherein the effective length of no more than 5 inches to prevent the snap clamp head from prematurely releasing from the support member.

7. The apparatus of claim 1 wherein the support member is cylindrical.

8. The apparatus of claim 1, wherein the snap clamp element comprises
a snap clamp head with the curvature attached to a threaded male end and
an extension member having a female end threaded to securely screwably attach to the threaded male end of the snap clamp head in a fixed non-rotatable manner and a male end threaded to screwably attach to the short cylinder of the tee pipe and having a release surface to permit stable rotation of the snap clamp element of up to 90 degrees about the axis of the short cylinder.

9. The apparatus of claim 8 wherein the female threaded end of the adapter is non-releasably affixed to the male threaded end of the snap clamp element with glue.

10. The apparatus of claim 1, wherein the short cylinder further comprises an extension member having a male end threaded to securely screwably attach to the threaded female end of the snap clamp element in a fixed non-rotatable manner and a female end threaded to screwably attach to the threaded male threaded end of the snap clamp element.

11. The apparatus of claim 1, wherein the opening of the snap clamp is suitable to detachably attach to a support pole having an outside diameter of about 0.75 inches.

12. The apparatus of claim 1 wherein the apparatus is made of plastic.

13. The apparatus of claim 1 wherein the support cylinder is a support in a lawn chair or in a fishing house.

14. The apparatus of claim 1 wherein the release surface is as low adhesion back size.

15. The apparatus of claim 1 wherein the release surface is Teflon® adhesive tape.

16. A method of using an adjustable fishing rod holder apparatus, comprising the steps of:
providing a fishing rod holder apparatus comprising,
a tee pipe having a long cylinder with a length and inside diameter suitable to loosely hold the handle of a fishing rod, and a short cylinder at right angles from the long cylinder, with a threaded inside surface and an axis down the center of the short cylinder;
a snap clamp element comprising a head with a width and a curvature adapted to securely fit around a support member without the use of screws or tools, a body and a male end threaded to screwably affix without the use of screws to the threaded inside surface of to the short cylinder that forms a female end;
a rotatable connection point comprising a release surface having a surface tension less than that of the material of the male threaded end of the snap clamp element and the female end of the short cylinder, configured to permit rotation of the snap clamp head about the axis of the short cylinder of up to 90 degrees, wherein the rotatable connection point, after rotation, will remain stable; and
an effective length comprising the distance between the point where the long axis of the short cylinder first touches the long cylinder and the point of the inside of the snap clamp curvature nearest the short cylinder that is sufficient to allow the fishing rod handle to be freely supported in the long cylinder but too great as to cause the snap clamp head to prematurely release from the support member;
snapping the snap clamp element to the support member at a suitable location about the long axis of the support member without use of tools;
rotating the tee pipe about the axis of the short cylinder of the tee pipe to achieve a desired upward angle from horizontal of the long cylinder of the tee pipe;
placing fishing line with a fish attracting element into the water
placing the handle end of a fishing pole in communication with the fishing line into the long cylinder.

17. The method of claim 16 wherein the effective length of the fish rod holder apparatus is at least 1.5 inches and no more than 5.0 inches.

18. The method of claim 16, further comprising the steps of:
removing the handle of the fishing rod from the apparatus when a fish is hooked, and reeling in the fish.

* * * * *